(12) United States Patent
Barthel et al.

(10) Patent No.: US 7,972,682 B2
(45) Date of Patent: Jul. 5, 2011

(54) REACTIVE SILICIC ACID SUSPENSIONS

(75) Inventors: Herbert Barthel, Emmerting (DE); Michael Dreyer, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 1042 days.

(21) Appl. No.: 11/722,941

(22) PCT Filed: Dec. 22, 2005

(86) PCT No.: PCT/EP2005/013918
§ 371 (c)(1),
(2), (4) Date: Jun. 27, 2007

(87) PCT Pub. No.: WO2006/072407
PCT Pub. Date: Jul. 13, 2006

(65) Prior Publication Data
US 2008/0113162 A1    May 15, 2008

(30) Foreign Application Priority Data
Dec. 29, 2004  (DE) .................. 10 2004 063 762

(51) Int. Cl.
*B32B 5/16* (2006.01)

(52) U.S. Cl. .......... 428/206; 428/32.11; 428/210; 428/323; 428/446; 428/447; 428/913.3

(58) Field of Classification Search ........... 428/32.11, 428/206, 210, 323, 446, 447, 913.3; 516/34
See application file for complete search history.

(56) References Cited

U.S. PATENT DOCUMENTS

| 4,005,044 A | 1/1977 | Raleigh |
| 4,184,880 A | 1/1980 | Huber et al. |
| 5,045,574 A | 9/1991 | Kuwata et al. |
| 2005/0133766 A1 * | 6/2005 | Barthel et al. .......... 252/500 |

FOREIGN PATENT DOCUMENTS

| DE | 2626942 A | 12/1976 |
| DE | 2641699 A | 3/1978 |
| EP | 0381376 A | 8/1990 |
| EP | 0924342 A | 6/1999 |

OTHER PUBLICATIONS

Patent Abstract of Romenia corresponding to RO 99500 A.

* cited by examiner

*Primary Examiner* — Betelhem Shewareged
(74) *Attorney, Agent, or Firm* — Brooks Kushman P.C.

(57) ABSTRACT

Suspensions of fine particles in a liquid containing a colloid-scale adhesive produce coatings and shaped articles which are both porous and robust.

23 Claims, No Drawings

REACTIVE SILICIC ACID SUSPENSIONS

CROSS-REFERENCE TO RELATED APPLICATION

This application is the U.S. national phase of PCT Appln. No. PCT/EP2005/013918 filed Dec. 22, 2005 which claims priority to German Application DE 10 2004 063 762.8 filed Dec. 29, 2004.

BACKGROUND OF THE INVENTION

1. Field of the Invention

The invention relates to suspensions, shaped articles, and coats.

2. Description of the Related Art

Particle suspensions, metal oxide suspensions and silica suspensions in water, with anionic electrostatic stabilization through the addition of alkalinity or anionic polyelectrolytes, are known. Another known form is cationic stabilization, through the addition of acidity or cationic polyelectrolytes.

When particle or silica suspensions are dried in the form of a shaped article or a coating, the resulting structures are not mechanically stable; the particle or silica cakes or bodies that form crumble to pieces or disintegrate under mechanical loading.

SUMMARY OF THE INVENTION

It is an object of the invention to improve on the prior art and in particular to produce, by drying, shaped articles or coatings from particle or silica suspensions, to give mechanically stable structures; in other words, the particles or silica cakes or bodies that form shall not crumble to pieces or disintegrate under mechanical loading. These and other objects are achieved by the invention, which provides suspensions comprising
  finely divided particles in amounts of 0.01%-50% by weight
  liquid
  colloid-scale adhesive.

DETAILED DESCRIPTION OF THE PREFERRED EMBODIMENTS

Preferred suspensions of the invention are as follows:
a)
  Inventive suspensions A comprising
  finely divided particles 0.01%-50% by weight, preferably 1-30% by weight, more preferably 2-15% by weight, based on the suspension
  liquid
  reactive monomer in amounts of preferably 0.1-100 parts by weight, more preferably 1-20 parts by weight, more preferably still 2-10 parts by weight, based on 100 parts by weight of particles
b)
  Inventive suspensions B comprising
  finely divided particles 0.01%-50% by weight, preferably 1-30% by weight, more preferably 2-15% by weight, based on the suspension
  liquid
  reactive oligomer or polymer in amounts of preferably 0.1-100 parts by weight, more preferably 1-20 parts by weight, more preferably still 2-10 parts by weight, based on 100 parts by weight of particles
c)
  Inventive suspensions C comprising
  finely divided particles 0.01%-50% by weight, preferably 1-30% by weight, more preferably 2-15% by weight, based on the suspension
  liquid
  crosslinking system in amounts of preferably 0.1-100 parts by weight, more preferably 1-20 parts by weight, more preferably still 2-10 parts by weight, based on 100 parts by weight of particles.
d)
  Inventive suspensions D comprising
  finely divided particles 0.01%-50% by weight, preferably 1-30% by weight, more preferably 2-15% by weight, based on the suspension
  liquid
  film-forming polymers in amounts of preferably 0.1-100 parts by weight, more preferably 1-20 parts by weight, more preferably still 2-10 parts by weight, based on 100 parts by weight of particles
e)
  Inventive suspensions E comprising
  finely divided particles 0.01%-50% by weight, preferably 1-30% by weight, more preferably 2-15% by weight, based on the suspension having reactive surface groups
  liquid
  Any desired combinations of A, B, C, D, and E are possible.

Liquids:

Inventive liquids are those having a viscosity in pure form of less than 100 mPas at 25° C., preferably less than 10 mPas, more preferably less than 2 mPas.

Examples are water, protic solvents such as ROH, for example MeOH, EtOH, isoPrOH, and nonprotic polar solvents, for example ketones such as acetone, methyl ethyl ketone, methyl isobutyl ketone, ethers such as tetrahydrofuran, dioxanes, amides such as dimethylformamide, and apolar solvents such as alkanes, for example cyclohexane, decanes, mineral spirits, for example low-boiling mineral spirits, cleaning spirits, or low-boiling and higher-boiling hydrocarbons, for example aromatic hydrocarbons such as benzene, toluene, and xylene.

Particularly preferred examples are protic and polar organic solvents, among which preference is given to methanol, ethanol, isopropanol, tetrahydrofuran, dioxane, acetone, methyl ethyl ketone, and methyl isobutyl ketone.

In another preferred form water is advantageous.

Particles:

Particles with an average diameter of less than 100 μm. The particles employed in accordance with the invention preferably have an average diameter of greater than 1 nm, more preferably of 1 nm to 100 μm, more preferably still of 10 nm to 10 μm, more particularly of 50 nm to 1000 nm, especially selected from 50 nm to 250 nm.

The particles of the invention are particles which are solid at room temperature under the pressure of the surrounding atmosphere, i.e., at between 900 and 1100 hPa.

The particles are preferably insoluble or sparingly soluble in water or in other solvents that may be used to prepare the suspension of the invention.

The particles have a solubility in water at a pH of 7.33 and an electrolyte background of 0.11 mol/l and a temperature of 37° C. of preferably less than 0.1 g/l, more preferably less than 0.05 g/l, under the pressure of the surrounding atmosphere, i.e., at between 900 and 1100 hPa.

The particles employed in accordance with the invention preferably have a molar mass of greater than 10,000 g/mol, more preferably a molar mass of 50,000 to 100,000,000 g/mol, in particular of 100,000 to 10,000,000 g/mol, measured in each case preferably by means of static light scattering.

The particles employed in accordance with the invention preferably have a carbon content of less than 50 percent by weight.

The particles preferably have a Mohs hardness of greater than or equal to 1. With particular preference the particles employed in accordance with the invention have a Mohs hardness of greater than 4.

Particles are preferably composed of organic resins such as silicone resins, e.g., methylsilicone resins; epoxy resins; acrylic resins, e.g., polymethyl methacrylates; polymers such as polyolefins, e.g., polystyrene; metal colloids, e.g., silver colloids; and metal oxides, e.g., oxides of Main Group III such as aluminum oxides, of Main Group IV such as silicon dioxide, germanium oxide, and of Main Group V, and, for example, oxides of the transition group metals, such as titanium(IV) dioxides; zirconium(IV) oxides; zinc oxides; and, for example, oxides of the lanthanides, such as cerium(IV) oxides; and also any desired mixtures of these oxides, such as mixed silicon dioxide-aluminum oxide oxides having any desired composition, preferably having a silicon dioxide content of 20% to 100% by weight, mixed silicon dioxide-iron (III) oxide oxides having any desired composition, preferably having a silicon dioxide content of 20% to 100% by weight, mixed silicon dioxide-titanium(IV) oxide oxides having any desired composition, preferably having a silicon dioxide content of 20% to 100% by weight; and also insoluble or sparingly soluble ionic and mineral compounds, examples being calcium carbonates, barium sulfates, iron(II) sulfides, pyrites, calcium silicates, aluminum silicates such as aluminum phyllosilicates, clays, for example bentonites, montmorillonites, and hectorites, which may also have been organically modified; micronized minerals and fine rock powders; and also sparingly soluble nonionic compounds, such as boron nitrides, silicon nitrides or silicon carbides.

Preference is given to metal oxides having BET specific surface areas of greater than 10 m²/g, such as metal oxides prepared in high-temperature processes, such as pyrogenic metal oxides prepared in flame processes, metal oxides prepared in plasma processes, metal oxides prepared in hot-wall reactors, and metal oxides prepared by laser methods.

Preference is given to silicas having BET specific surface areas of greater than 10 m²/g, more preferably to synthetic silicas such as silicas prepared wet-chemically, for example silica sols and silica gels; pyrogenic (fumed) silicas prepared in flame processes; silicon dioxides prepared in plasma processes; silicon dioxides prepared in hot-wall reactors; and silicon dioxides prepared with laser methods. Particular preference is given to fumed silica prepared at preferred temperatures of above 1000° C.

Particles of the suspension may also be selected from any desired mixtures of the particles specified above.

The particles preferably have an average primary particle size d-PP of 0.5 to 1000 nm, preferably 5 to 100 nm, more preferably 5 to 50 nm.

Suitable methods of measurement for this purpose are, for example, the determination of the BET surface areas and of the material density: d-PP=6/(BET*material density) or, for example, transmission electron microscopy or high-resolution scanning electron microscopy, in the field emission mode, for example, or ultrasound spectroscopy in the measurement range of 1 to 100 MHz, for example.

The particles preferably have an average secondary structure particle size or aggregate particle size d-Aggr of 50 to 5000 nm, preferably 100 to 500 nm, measured as a hydrodynamic diameter.

Suitable methods of measurement for this purpose are, for example, dynamic light scattering or photocorrelation spectroscopy, for the purpose of measuring concentrations >0.01% by weight of solids, it being possible for this measurement to be performed as backscattering and/or to be corrected by means of cross-correlation against multiple scattering.

The particles preferably have an average tertiary particle size or agglomerate particle size d-Aggl of >100 nm, measured as a geometric diameter.

Suitable methods of measurement for this purpose are, for example, laser light diffraction.

The particles preferably have a specific surface area of 1 to 1000 m²/g, preferably 10 to 500 m²/g, and most preferably of 100 to 300 m²/g. The BET surface area is measured by known methods, preferably in accordance with Deutsche Industrie Norm DIN 66131 and DIN 66132.

Preferably the particles have a fractal surface dimension $D_s$ of preferably less than or equal to 2.3, more preferably less than or equal to 2.1, and most preferably of 1.95 to 2.05, the fractal surface dimension $D_s$ being defined here as follows: particle surface area is proportional to the particle radius R to the power of $D_s$.

Preferably the particles have a fractal mass dimension Dm of preferably less than or equal to 2.8, more preferably less than or equal to 2.5, and most preferably of 1.9 to 2.2. The fractal mass dimension $D_m$ is defined here as follows: particle mass is proportional to the particle radius R to the power of $D_m$.

It is also possible to use hydrophilic silicas which are freshly prepared and, for example, come directly from the flame, and those which have been stored or have already been packed in the standard commercial way. It is also possible to use hydrophobicized or silylated silicas, e.g., commercially customary silicas.

It is possible to use both uncompacted silicas, with tapped densities of less than 60 g/l, and compacted silicas, with tapped densities of greater than 60 g/l. The tapped density can be determined in accordance with DIN EN ISO 787-11.

Mixtures of different silicas can be employed, such as mixtures of silicas with different BET surface areas, or mixtures of silicas with different degrees of hydrophobicization or silylation.

In one preferred version the particles are hydrophobic particles, more preferably surface-modified metal oxides, the surface-modified metal oxides being preferably silylated metal oxides modified with organosilicon compounds, and with very particular preference being silylated fumed silica.

With preference it is possible to silylate particles using organosilicon compounds, such as, for example,
(i) organosilanes or organosilazanes of the formula $$R^1_d SiY_{4-d} \quad (I)$$

and/or their partial hydrolysates,
where
$R^1$ each may be identical or different and is a monovalent, unsubstituted or substituted hydrocarbon radical which has 1 to 24 carbon atoms and may be interrupted by oxygen atoms,
d is 1, 2 or 3, and Y each may be identical or different and is a halogen atom, a monovalent Si N-bonded nitrogen radical to which a further silyl radical may be bonded, or is —OR² or —OC(O)OR², R² being a hydrogen atom or a monovalent, unsubstituted or substituted hydrocarbon radical which has 1-8 carbon atoms and may be interrupted by oxygen atoms, or (ii) linear, branched or cyclic organosiloxanes composed of units of the formula

$$R^3_e(OR^4)_f SiO_{(4-e-f)/2} \quad (II)$$

where

R³ each may be identical or different and has one of the definitions specified above for R¹, R⁴ each may be identical or different and has a definition specified for R², e is 0, 1, 2 or 3, and f is 0, 1, 2 or 3, with the proviso that the sum e+f is ≦3, or mixtures of (i) and (ii).

The organosilicon compounds that can be used to silylate the particulate solids may, for example, be mixtures of silanes or silazanes of the formula (I), preference being given to mixtures of methyl-chlorosilanes on the one hand, or alkoxy silanes and, if desired, disilazanes on the other.

Examples of R¹ are alkyl radicals such as the methyl, ethyl, n-propyl, isopropyl, 1-n-butyl, 2-n-butyl, iso-butyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl and the allyl radical; cycloalkyl radicals such as the cyclopentyl, cyclohexyl, cycloheptyl and methylcyclohexyl radicals; aryl radicals such as the phenyl, naphthyl, anthryl, and phenanthryl radicals; alkaryl radicals such as the o-, m-, and p-tolyl radicals, xylyl radicals, and ethylphenyl radicals; and aralkyl radicals such as the benzyl radical and the alpha- and beta-phenylethyl radicals.

Examples of substituted hydrocarbon radicals R are halogenated radicals such as the 3-chloropropyl radical, the 3,3,3-trifluoropropyl radical, and chlorophenyl radicals; hexafluoropropyl radicals such as the 1-trifluoromethyl-2,2,2-trifluoroethyl radical, the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical, and the perfluoroisopropyloxypropyl radical.

Preference is given to methyl, octyl, and vinyl radicals with particular preference given to the methyl radical.

R² is preferably the methyl and ethyl radical.

Examples of organosilanes of the formula (I) are alkylchlorosilanes such as methyltrichlorosilane, dimethyldichlorosilane, trimethylchlorosilane, octylmethyldichlorosilane, octyltrichlorosilane, octadecylmethyldichlorosilane, and octadecyltrichlorosilane; methylmethoxysilanes such as methyltrimethoxysilane, dimethyldimethoxysilane, and trimethylmethoxysilane; methylethoxysilanes such as methyltriethoxysilane, dimethyldiethoxysilane, and trimethylethoxysilane; methylacetoxysilanes such as methyltriacetoxysilane, dimethyldiacetoxysilane, and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane, and vinyldimethylethoxysilane; disilazanes such as hexamethyldisilazane, divinyltetramethyldisilazane, and bis-(3,3-trifluoropropyl)tetramethyldisilazane, cyclosilazanes such as octamethylcyclotetrasilazane, and silanols such as trimethylsilanol.

Preference is given to methyltrichlorosilane, dimethyldichlorosilane, and trimethylchlorosilane, or hexamethyldisilazane.

Examples of organosiloxanes of the formula (II) are linear or cyclic dialkylsiloxanes having an average number of dialkylsiloxy units of greater than 3. The dialkylsiloxanes are preferably dimethylsiloxanes. Particular preference is given to linear polydimethylsiloxanes having the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy and dimethylhydroxysiloxy groups, more particularly having trimethylsiloxy or dimethylhydroxysiloxy end groups.

The stated polydimethylsiloxanes preferably have a viscosity at 25° C. of 2 to 100 mPas.

Further examples of organosiloxanes are silicone resins, in particular those comprising methyl groups as the alkyl group, with particular preference going to those which comprise $R^1_3SiO_{1/2}$ and $SiO_{4/2}$ units or to those which comprise $R^1SiO_{3/2}$ and, if desired, $R^1_2SiO_{2/2}$ units, with R¹ having one of the definitions stated above.

The stated silicone resins preferably have a viscosity at 25° C. of 500 to 5000 mm²/s.

In the case of silicone resins having a viscosity of greater than 1000 mm²/s at 25° C., preference is given to those which can be dissolved in a readily technically manageable solvent, preferably, alcohols such as methanol, ethanol, and isopropanol, ethers such as diethyl ether and tetrahydrofuran, siloxanes such as hexamethyldisiloxane, alkanes such as cyclohexane or n octane, or aromatics such as toluene or xylene, with a concentration above 10% by weight and with a mixture viscosity of less than 1000 mm²/s at a temperature of 25° C. under the pressure of the surrounding atmosphere.

Preference among the solid organosiloxanes is given to those which dissolve in a technically manageable solvent (as defined above) with a concentration of greater than 10% by weight and with a mixture viscosity of less than 1000 mm²/s at a temperature of 25° C.

The substances used to prepare the silylated silicas employed in accordance with the invention in each case constitute a single kind or else a mixture of at least two kinds of such substances.

A preferred process for preparing the silylated silicas employed in accordance with the invention will be described below, with reference to silica as the preferred starting product, particular preference being given to the use of fumed silicas.

The hydrophobicization and silylation carried out preferably for the preparation of the silicas employed in accordance with the invention may be carried out as a discontinuous reaction, i.e., in a batch process, or as a continuous reaction, the continuous reaction being preferred.

The hydrophobicization and silylation may be realized in one step or in 2 or 3 successive steps. This means that the reaction may be preceded by loading (physisorption of the silylating agent) and followed, preferably, by a purification step. 3 successive steps are preferred: (1) loading—(2) reaction—(3) purification.

The loading temperature is preferably −30 to 350° C., more preferably 20 to 120° C. The reaction temperatures range preferably from 50 to 400° C., more preferably from 50 to 330° C. The reaction times are preferably from 1 minute to 24 hours, more preferably 30 minutes to 4 hours. The reaction pressure is preferably situated in the atmospheric pressure range, i.e., at between 900 and 1100 hPa. The purification temperature ranges preferably from 100 to 400° C.

Effective movement and commixing of silica and silylating agent during step (1) loading, (2) reaction, and (3) purification are necessary. This is accomplished preferably by mechanical or gas-supported fluidization. Gas-supported fluidization can be effected by means of all inert gases which do not lead to secondary reactions, degradation reactions, oxidation events, or flame or explosion phenomena. The superficial gas velocity here is 0.05 to 5 cm/s, more preferably 0.05 to 1 cm/s. Mechanical fluidization may be effected by means of paddle stirrers, anchor stirrers, and other suitable stirring elements.

In one particularly preferred version only the amount of gas sufficient to maintain a low-oxygen atmosphere is supplied, preferably less than 5% by volume being supplied, and fluidization then takes place purely by mechanical means.

The reaction is preferably carried out in an atmosphere which does not lead to the oxidation of the silylated silica, i.e., preferably less than 10% by volume oxygen, with particular preference less than 2.5% by volume, the best results being obtained at less than 1% by volume oxygen.

There is effective introduction of the silylating agents into the silica. Where the silylating agents are liquid compounds at application temperature, effective atomization techniques are employed with preference. Atomization in 1-fluid nozzles under pressure (5 to 20 bar), spraying in 2-fluid nozzles under pressure (gas and liquid, 2 to 20 bar), ultrafine division with atomizers, etc.

The silylating agent is preferably added in the form of a very finely divided aerosol, the aerosol having a settling velocity of preferably 0.1 to 20 cm/s and a droplet size with an aerodynamic equivalent diameter of 5 to 25 μm.

Optionally it is possible to add preferably protic solvents, such as liquid or vaporizable alcohols or water; typical alcohols are isopropanol, ethanol, and methanol. Mixtures of the abovementioned protic solvents may also be added.

Optionally it is possible to add preferably acidic or basic catalysts. These catalysts may be basic in nature, in the sense of a Lewis base or of a Brønsted base, such as ammonia, or acidic in nature, in the sense of a Lewis acid or a Brønsted acid, such as hydrogen chloride. If catalysts are used, the amounts involved are preferably traces, i.e., less than 1000 ppm. With particular preference no catalysts are added.

The purification step is characterized by agitation, with preference being given to slow agitation and slight commixing. The purification step is further characterized by an increased gas input, corresponding to a superficial gas velocity of 0.001 to 10 cm/s. Additionally the purification step may involve mixing with mechanical stirring elements. In that case the stirring elements are set and moved in such a way that, preferably, mixing and fluidization occur, but not complete vortexing.

In addition, during the silylating step, it is possible to employ methods for mechanical compaction, such as, for example, press rollers, ball mills, edge runner mills, screw compactors, and briquetting machines.

Additionally it is possible, before, during or after the silylating step, to employ methods for the deagglomeration of the silica, such as pinned-disk mills or milling/classifying devices, and/or methods for mechanical compaction of the silica, such as press rollers, for example, or compaction by withdrawal of the air or gas under suction, by means of suitable vacuum methods, or other methods of mechanical compaction, such as, for example, press rollers, ball mills, edge runner mills, screw compactors, and briquetting machines.

Particularly preferred are hydrophobic and highly hydrophobic and highly apolar particles.

Where the particles are silicon dioxide particles, such particles then preferably have a density of surface silanol groups, SiOH, of less than 1 $SiOH/nm^2$, preferably less than 0.5 $SiOH/nm^2$, more preferably less than 0.25 $SiOH/nm^2$.

The particles are preferably characterized in that they are not wetted completely by pure water and by water in which salts, such as sodium chloride, have been dissolved; in other words, that they have a contact angle θ in air with respect to water of greater than 0°. The water contact angle θ of the particles is preferably between 60° and 180°, more preferably greater than 90°.

The particles are finely divided solids which are preferably not completely water-wettable, or only incompletely water-wettable, in other words particles which exhibit some water wetting but not complete water wetting; that is, those which have a surface energy γ of less than 72.5 $mJ/m^2$ and a water contact angle θ in air of greater than 0°.

Preferred particles are those having a fractal mass dimension (Dm) of <3, in particular <2.5, more particular <2.2, especially <2.1.

Preferred particles are those having tapped densities to DIN EN ISO 787 11 of <500, more preferably <250 g/l, yet more preferably <120 g/l, and most preferably <60 g/l.

Preferred particles are those which are composed of agglomerates with a size of 0.5 to 100 μm, composed in turn of aggregates having a size of 50 to 500 nm, and hydrodynamic diameters in water of 100 to 250 nm.

Preferred particles are those which form accumulations with a porosity >0.5, particularly >0.8, in particular >0.9, especially >0.95. The porosity ε of an accumulation, shaped article or coating is defined as ε=1−$volume_{material}$/$volume_{article}$
where $volume_{material}$=volume of the particles and of the colloid-scale adhesive, and $volume_{article}$=volume of the accumulation, shaped article or coating. The porosity ε can be determined by means of mercury porosimetry or using inert gases such as helium or argon, by measuring the empty volume, $volume_{empty}$, of the accumulation, shaped article or coating, with ε=$volume_{empty}$/$volume_{article}$.

Colloid-scale adhesives bond and/or joins the particles at the colloidal and colloid-scale level, and is added preferably at 0.1-100 parts by weight, preferably 1-20 parts by weight, more preferably 2-10 parts by weight, based on 100 parts by weight of particles.

The colloid-scale adhesive may be the same as or different from the particles.

The material of the colloid-scale adhesive is preferably different from the material of the particles in its physical composition, preferably with >5% by weight, more preferably with >50% by weight difference in its physical composition.

Preferably, with the material of the colloid-scale adhesive, a fluid and/or elastic bond is created between the particles.

Preferred embodiments of colloid-scale adhesive.

a) Reactive Monomer:

Crosslinkable and/or polymerizable monomers, such as cationically, anionically, free-radically or photolytically polymerizable monomers, condensable monomers, monomers capable of addition reaction, such as glycidyl ethers in a mixture with amines, mercaptans or carboxylic acids, such as alkyl-acrylic acids, and carboxylic esters, such as methyl methacrylate, such as isocyanates and water or diols, triols, and polyols, such as alkoxysilanes and their mixtures, having per molecule more than one alkoxy group per Si atom, or, in the case of mixtures, having on average more than 1.5 alkoxy groups per Si, metal alcoholates, such as titanates, such as titanium tetrabutylate, zirconates, such as zirconium tetraethylate, olefinic monomers such as monostyrene, preferably alkoxysilanes and mixtures thereof, having per molecule more than one alkoxy group per Si atom, or, in the case of mixtures, having on average more than 1.5 alkoxy groups per Si, more preferably alkoxysilanes and their mixtures which carry per Si atom one or more methyl groups.

b) Reactive Oligomer or Polymer:

All polymers, prepolymers, reactive precursors, and polymers which can be used as binders, for paints and varnishes for example, and which are able to crosslink or react with themselves or with the particles.

Preferred examples are polymers or oligomers which are able to enter into zwitterions or ion pairs or ionic bonds with themselves or with the particles.

Preferred examples of these, according to the invention, are, where strongly or weakly acidic groups are present on the particle, groups, for example, such as —COOH or acidic —OH, such as M-OH, such as B—OH, P—OH, Al—OH, SiOH, Ge—OH, Zr—OH groups, in turn preferably polymers having basic groups, such as polymers which carry amino groups, such as primary, secondary or tertiary amines, aminosiloxanes for example, such as linear and branched aminosiloxanes, such as liquid or solid aminosiloxanes, such as aminosiloxane polymers or aminosiloxane resins, polydimethylsiloxanes for example having terminal 3-aminopropyl or 1-aminomethyl groups or having 3-aminopropyl or 1-aminomethyl groups attached in the chain to an Si atom, having a viscosity at 25° C. of 500-5000 mPas and an amine number of 0.5 to 10. Preference is given to the combination of particles with SiOH groups and aminopolysiloxane colloid-scale adhesive, particular preference to fumed silica as the particles and aminopolysiloxanes as the colloid-scale adhesive, such as polydimethylsiloxanes containing 3-aminopropylmethylsiloxy groups.

Examples of organosiloxanes are linear or cyclic dialkylsiloxanes having an average number of dialkylsiloxy units of greater than 3. The dialkylsiloxanes are preferably dimethylsiloxanes. Particularly preferred are linear polydimethylsiloxanes having the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy and dimethylhydroxysiloxy groups, in particular having trimethylsiloxy or dimethylhydroxysiloxy end groups.

The stated polydimethylsiloxanes preferably have a viscosity at 25° C. of 20 to 1,000,000 mPas, more preferably of 500 to 5000 mPas.

Further examples of organosiloxanes are silicone resins, more particularly those comprising methyl groups as the alkyl group, the resins in question with particular preference comprising $R_3SiO_{1/2}$ and $SiO_{4/2}$ units or resins comprising $RSiO_{3/2}$ and, if desired, $R_2SiO_{2/2}$ units, R having one of the above-mentioned definitions of R1.

The stated silicone resins preferably have a viscosity at 25° C. of 500 to 5000 $m^2/s$.

In the case of silicone resins having a viscosity of greater than 1000 $mm^2/s$ at 25° C., preference is given to those which can be dissolved in a readily technically manageable solvent, such as, preferably, alcohols such as methanol, ethanol, and isopropanol, ethers such as diethyl ether and tetrahydrofuran, siloxanes such as hexamethyldisiloxane, alkanes such as cyclohexane or n-octane, or aromatics such as toluene or xylene, with a concentration above 10% by weight and with a mixture viscosity of less than 1000 $mm^2/s$ at a temperature of 25° C. under the pressure of the surrounding atmosphere.

Among the solid organosiloxanes, preference is given to those which dissolve in a technically manageable solvent (as defined above) with a concentration greater than 10% by weight and with a mixture viscosity of less than 1000 $mm^2/s$ at a temperature of 25° C.

The organosiloxanes may in each case be a single kind or else a mixture of at least two kinds of such substances.

Further preferred examples are silane-terminated or silane-functional polymers, such as polymers which contain mono-, di-, and tri-alkoxysilane radicals, terminally or bonded in the chain; examples thereof are silane-terminated polymers prepared by the reaction of aminoalkyl-alkoxysilane and mono-, di- and/or poly-isocyanates, or alkoxysilane-functional polyols prepared by copolymerization of methacryloyloxyalkylsilanes and acrylates or alkyl acrylates, including copolymerization with other olefins, such as styrenes, such as monostyrene, or by reaction of alkoxysilanes with polyols, such as polyacrylate polyols, polyester polyols or polyether polyols, of the kind used for preparing polyurethanes. The silane termination of polyacrylate polyols can be accomplished by copolymerization with methacryloyloxy-functional alkoxysilanes, such as 3-methacryloyloxypropyltrimethoxysilane or, preferably, with 1-methacryloyloxymethyltrimethoxysilane. The silane termination of polyisocyanates can be accomplished by reaction with amino-functional alkoxysilanes, such as 3-aminopropyltrimethoxysilane or, preferably, with 1-piperazinomethyltrimethoxysilane.

c) Crosslinking Systems

Resin and curing agent systems of the kind used for preparing resins and elastomers, such as for epoxy resins and epoxy elastomers, polyurethane resins and polyurethane elastomers, silicone resins and silicone elastomers, acrylates, polyolefins, polycarbonates, polysulfones, polysulfides, and polyamides.

Preferred inventive examples of crosslinking systems are silicone resins and silicone rubbers. Preferred inventive examples thereof are 1-component or 2-component silicone elastomers stable on storage in the absence of moisture but vulcanizing and curing on exposure to water or moisture, or the 1-component or 2-component silicone elastomers which are crosslinkable peroxidically, for example at elevated temperature, such as 80 to 200° C., for example by linkage of saturated and/or unsaturated alkyl groups, or are crosslinkable by addition reaction of olefinic C=C double bonds and silicon-hydrogen groups Si—H, preferably under the action of a catalyst, such as platinum, palladium or ruthenium, at room temperature or temperatures from 10 to 150° C.

One variant are crosslinking systems from the area of coating materials.

Examples are addition polymers, such as poly(meth)acrylates, such as polyvinyl esters, such as polyvinyl alcohols, such as polyvinyl acetals, such as polyvinyl chloride, such as polyfluorinated polyethylenes, with monomeric starting components such as methyl methacrylate, butyl acrylate, ethylhexyl acrylate, hydroxyethyl acrylate, hydroxyethyl methacrylate, hydroxypropyl methacrylate, acrylic acid, and styrene.

Examples are polycondensation resins such as oil-free saturated polyesters and oil-modified polyester resins.

Examples are fatty oils, short-oil, medium-oil, and long-oil alkyd resins, stand oils, and combinations thereof, and also modified alkyd resins, such as styrene-modified alkyd resins, acrylic ester-modified alkyd resins, silicone-modified alkyd resins, urethane-modified alkyd resins, and epoxy resin-modified alkyd resins.

Examples are oxidatively drying film-forming binders, such as short-oil, medium-oil, and long-oil alkyd resins, stand oils, and combinations thereof, and polyesters.

Chemically or reactively drying film-forming binders, such as polyurethanes, such as 1-component and 2-component polyurethanes, such as epoxy resin system, such as 2-component epoxy resin systems, such as epoxides which are crosslinked with amines and those which are crosslinked with isocyanates.

Examples are unsaturated polyester resins which are formed from di-, tri- and mono- or poly-functional carboxylic acids and their anhydrides, such as phthalic anhydride, isophthalic acid, terephthalic acid, hexahydrophthalic anhydride, tetrahydroxophthalic anhydride, hexahydroxoterephthalic acid, adipic acid, maleic acid, fumaric acid, azeleic acid, sebacic acid, decanedicarboxylic acid, dimerized fatty acids, tri-mellitic anhydride, pyromellitic anhydride, 1,4-cyclohexanedicarboxylic acid, dimethylolpropionic acid and from mono- or poly-functional alcohols, such as polyols, such as ethylene glycol, 1,2-propanediol, 1,5-pentanediol, diethylene glycol, 1,4-butanediol, 1,6-hexanediol, neopentyl glycol, trimethylpentanediol, 1,4-cyclohexanedimethanol, tricyclodecanedimethanol, trimethylolpropane, glycerol, pentaerythritol, hydrogenated bisphenol A, bisphenol A bishydroxyethyl ether, and modifications thereof with monomers of the type of acrylic monomers, alkoxysiloxanes, and alkoxypolysiloxanes.

Examples are amino-formaldehyde resins, such as urea formaldehyde resins, melamine-formaldehyde resins, and benzoguanamine resins, prepared from amino compounds such as aromatic amines, carboxamides, cyanamides, guanamines, guandiamines, ureas, sulfonamides, sulfurylamides, thioureas, triazines (melamine resins), and urethanes, and from carbonyl compounds such as acetaldehyde, acetone, butyraldehyde, formaldehyde, glyoxal, propionaldehyde, and trichloroacetaldehyde. Further examples are phenol-formaldehyde resins.

Preferred inventive examples are silicone resins composed of $RSiO_{3/2}$, $R_3SiO_{1/2}$, and $SiO_{4/2}$ units, R having a definition specified above for $R^1$, in any desired mixture, preferably having molar masses of 100 to 20,000 grams per mole, and a viscosity of 50 to 50,000 mPas at a temperature of 25° C. or, if the silicone resins are solids, for a viscosity of the 0.1% to 50% strength by weight solution of the silicone resins in an inert solvent such as toluene, tetrahydrofuran, methyl ethyl ketone or isopropanol of 50 to 50,000 mPas at a temperature of 25° C. Preferred examples are methylsilicone resins and phenylsilicone resins and methylphenylsilicone resins. Preferred silicone resins are those having primary, secondary, and tertiary aminoalkyl functions and having an amine number of 0.5 to 10 and a molecular weight of 250-20,000 mol/g.

Examples are poly addition resins such as polyurethanes, such as, for example, 2-component polyurethanes, 1-component polyurethane systems, 1-component moisture-curing polyurethanes obtained from prepolymers such as polyisocyanates, prepared from base products such as aromatic diisocyanates, such as toluene diisocyanate, methylenediphenyl diisocyanate, and xylene diisocyanate, aliphatic diisocyanates, such as hexamethylene diisocyanate or hexyl diisocyanate, cycloaliphatic diisocyanates, and the isomer mixtures of the respective diisocyanates listed, blocked or protected polyisocyanates, based on typical blocking agents such as malonic esters and acetoacetic esters, secondary amines, butanone oximes, phenols, caprolactams, and alcohols.

Examples are epoxy resins, such as liquid, semisolid, and solid epoxy resins, composed for example of binders such as bisphenol A, such as bisphenol F, such as phenol novolak glycidyl ethers, such as cresol novolak glycidyl ethers, such as cycloaliphatic glycidyl compounds, and such as epoxidized cycloolefins, and curing agents based on aliphatic amines, such as polyfunctional amines based on polyetherpolyamines, such as alkylenediamines such as propylenediamines, or such as cycloaliphatic amines, polyaminoamides, Mannich bases, epoxide adducts, mercaptans, and such as acid anhydrides.

Preferred inventive examples are room-temperature moisture-curing 1-component silicone sealant and adhesive systems. Preference in particular is given to those which are free of filler.

Examples of suitable polymers for these are OH-terminal polydimethylsiloxanes having a viscosity of 20 to 200 000 mPas, preferably 1000-100 000 mPas.

Crosslinkers which can be used are known crosslinkers, silanes for example, and monomeric and oligomeric organosilicon compounds, which are used in commercially customary 1-component moisture-curing silicone sealant and adhesive systems, such as, for example, tri- and tetra-alkoxysilanes, such as tri- and tetramethoxy- and -ethoxysilanes, tri- and tetra-acetoxysilanes, tri- and tetra-oximosilanes, silylamines such as tris and tetrakis(alkylamino)silanes. Preference is given to tris-(alkylamino)monoalkylsilanes and tetrakis(alkylamino)-silanes, which lead to crosslinking without further addition of catalyst or of metal compound.

Preferred examples of silamines and aminosilanes are tris (n-butylamine)methylsilane $[(CH_3CH_2CH_2CH_2)HN]_3SiCH_3$, tris(tert-butylamine)methylsilane $[(CH_3)_3CNH]_3SiCH_3$, tris(isopropylamine)methylsilane, $[(CH_3)_2CHNH]_3SiCH_3$, tris(cyclohexylamine)methylsilane, and $[(C_6H11)NH]_3SiCH_3$.

Preferred inventive examples are silicone compositions which are preferably filler-free, which are composed of two components, A and B, and which cure by condensation reactions, at room temperature or at elevated temperature.

The component A employed in accordance with the invention is an organopolysiloxane that contains groups capable of condensation, and comprises preferably units of the formulae $SiO_{4/2}$, $R_3SiO_{1/2}$, $R_2SiO_{2/2}$, and $RSiO_{3/2}$, R having one of the definitions stated above for $R^1$.

Particularly preferred are those components A of the formula A1

$$HO-[SiR_2O]_n-H \qquad (III),$$

in which each

R may be alike or different and has a definition stated above for $R^1$, and n is an integer of at least 10, preferably at least 30, more preferably at least 100.

The organopolysiloxanes (A1) employed in accordance with the invention are preferably α,ω-dihydroxypoly-dimethylsiloxanes.

The average value for the number n in formula (III) is preferably chosen such that the organopolysiloxane (A1) of the formula (III) has a viscosity of 10 to 250,000 mPas, more preferably of 1000 to 100,000 mPas, in each case at 25° C.

Although not specified in formula (III), up to 10 mole percent of the diorganosiloxane units may have been replaced by other siloxane units, which, however, are present only as impurities which are more or less difficult to avoid, such as $R_3SiO_{1/2}$, $RSiO_{3/2}$, and $SiO_{4/2}$ units, with R having the definition specified for it above.

The polydiorganosiloxanes in accordance with formula (III) are commercially customary products or can be prepared by processes that are known in the art, as for example by addition polymerization and/or condensation of low molecular weight cyclic and/or linear, hydroxy- and/or alkoxy-end-blocked organopolysiloxanes.

The organopolysiloxane resin (A2) employed in accordance with the invention is preferably that composed of units of the general formula

$$(R^2O)_g R_h SiO_{(4-g-h)/2} \qquad (IV),$$

where each
R and $R^2$ independently of one another may be alike or different, and have one of the definitions stated above,
h is 0, 1, 2 or 3, and
g is 0, 1, 2 or 3, with the proviso that the sum of g+h is less than or equal to 3.

The organopolysiloxane resin (A2) employed in accordance with the invention is preferably that having a molecular weight Mw of 500 to 100,000, preferably of 1000 to 20,000, and a viscosity of 10 mPas to 10,000,000 mPas, preferably 1000 mPas to 1,000,000 mPas, more preferably of 10,000 mPas to 500,000 mPas, at 25° C.

Although not expressed by the formula (IV), it is possible for the organopolysiloxane resin, by virtue of its preparation, to contain up to 10 percent by weight of Si-bonded chlorine atoms.

The organopolysiloxane resin (A2) employed in accordance with the invention is a commercially customary product or can be prepared by conventional methods, such as, for example, by condensation of low molecular weight organopolysiloxane resins in suspension, the low molecular weight organopolysiloxane resins being preparable by solvolysis and condensation of a solution of the corresponding silanes with Si-bonded chlorine atoms in a water-immiscible solvent by means of an alcohol/water mixture.

Instead of the organopolysiloxane resin used as component (A2), it is also possible to employ organosilane containing groups capable of condensation, and/or the partial hydrolysates of such an organosilane.

Examples of component (B) are all organosilanes which it has already been possible to date to use in condensation-crosslinking organopolysiloxane compositions, such as alkoxysilanes, acetoxysilanes, aminosilanes, and oximosilanes. Preference is given to aminosilanes as described for example above. Examples are silanes, and monomeric and oligomeric organosilicon compounds, which are used in commercially customary 1-component moisture-curing silicone sealant and adhesive systems, such as, for example, tri- and tetra-alkoxysilanes, such as tri- and tetramethoxy- and -ethoxysilanes, tri- and tetra-acetoxysilanes, tri- and tetra-oximosilanes, silylamines such as tris and tetrakis(alkylamino)silanes. Preference is given to tris(alkylamino)monoalkylsilanes and tetrakis(alkylamino)silanes, which lead to crosslinking without further addition of catalyst or of metal compound.

Preferred examples of silamines and aminosilanes are tris(n-butylamine)methylsilane $[(CH_3CH_2CH_2CH_2)HN]_3SiCH_3$, tris(tert-butylamine)methylsilane $[(CH_3)_3CNH]_3SiCH_3$, tris(N-isopropylamine)methylsilane, $[(CH_3)_2CHNH]_3SiCH_3$, tris(cyclohexylamine)methylsilane, and $[(C_6H_{11})NH]_3SiCH_3$.

Preferred inventive examples are 1-component or 2-component addition-crosslinkable liquid and solid silicone compositions, preferably those which are filler-free. Crosslinking is accomplished by addition reaction of olefinic C=C double bonds and silicon-hydrogen groups Si—H, preferably under the action of a catalyst, such as platinum, palladium or ruthenium, at room temperature or temperatures from 10° C. to 150° C.

2 component silicone compositions of the invention are composed of organopolysiloxanes (C), which are linear, cyclic or branched siloxanes having at least 18 silicon atoms, with an average viscosity of not more than 1000 Pas at 25° C., and at least one aliphatic unsaturated hydrocarbon radical having 2 to 6 carbon atoms, such as vinyl groups or allyl groups or hexenyl groups, the organopolysiloxanes (C) preferably containing methyl groups and vinyl groups, and of organopolysiloxanes (D) which contain Si bonded hydrogen atoms, and are preferably cyclic, linear and branched polysiloxanes, and preferably have an average viscosity of 10 to 20,000 mPas at 25° C., and preferably contain at least 2 Si H groups, and preferably contain 0.1% to 1.7% by weight of Si bonded hydrogen.

As catalyst it is possible to use compounds of the metals platinum, rhodium, palladium, iridium, and ruthenium, preferably platinum.

d)
Film-forming Polymers

Examples are physical drying film-forming binders, such as polyvinyl chloride and its copolymers, polyacrylates and their copolymers, polyvinyl acetates and polyvinyl butyrals and their copolymers, bitumen, hydrocarbon resins; chlorinated rubbers, cyclorubber, polyurethanes, epoxy resins, epoxy resins-polyesters. Preferred examples are silicone oils, such as organo-functional silicone oils, with particular preference aminoalkyl-functional polysiloxanes and polydimethylsiloxanes, and silicone resins, especially organo-functional silicone resins, with particular preference aminoalkyl-functional silicone resins.

Preferred examples are silicone copolymers, and hybrid systems which comprise organopolysiloxanes and polymers that are free of silicon atoms. Preferred examples according to the invention are thermoplastic silicone elastomers which have been prepared by alpha-omega end-termination with 3 aminoalkyldialkylsiloxy radicals, such as 3 aminopropyldimethylsiloxy radicals, and with a degree of end termination of greater than 90%, preferably greater than 95%, more preferably greater than 99%, based on the initial OH end groups of a linear alpha-omega terminal OH-polydimethylsiloxane, and subsequent reaction of the resultant alpha-omega terminal aminoalkylsiloxanes with alkyl diisocyanates as described above under a) to c). The thermoplastic silicone elastomers preferably have a siloxane fraction of greater than 80% by weight, preferably greater than 90% by weight, and are preferably solid at 25° C. and have a viscosity of 10,000 to 100,000 Pas at a temperature of 110° C.

Colloid-scale adhesives which contain silicon atoms are preferred, particularly those which contain more than 5% by weight of silicon atoms, especially those which contain more than 10% by weight of silicon atoms, more particularly those which contain more than 25% by weight of silicon atoms.

e)

Preference is further given to finely divided particles which have reactive surface groups, such as, for example, above-described particles which have been modified with silylating agent in order to obtain the reactive surface groups.

Examples of silylating agents of the invention containing reactive groups are set out below.

Organosilanes of the formula

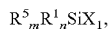

where m+n+1=4,
n=0, 1 or 2,
and m is=1, 2, or 3
or mixtures of silanes or organosilanes with n=0 to 2 and m=1 to 3, where m=1 preferably,
$R_5$ is hydrogen or a monovalent or divalent hydrocarbon radical containing one or more or different heteroatoms Z and having 1 to 12 C atoms, preferably 3 to 8 C atoms.

The hydrocarbon radical may be Si C bonded or Si O C bonded. Si C bonding is preferred.

Where the radical in question is a divalent hydrocarbon radical, it may be bonded to 2 Si atoms or may be an organosilane of the structure

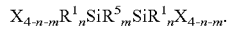

The heteroatom Z is preferably an element from Main Groups 3, 4 (not C), 5, and 6 in the Periodic Table of the Elements.

Preferred examples of Z are: N, P, O, and S.
Preferably Z is contained in C—Z structures.
Examples of C—Z structures are as follows:
Z=N: C—NR$^6_2$ (amine), C—NR$^6$—Si≡ (amine)
   C=NR$^6$, (imine)
   C(O)—N—, CR$^6$=N—, C(OR$^6$)=N—,
   C≡N (nitrile), C≡N=O (cyanate), N=C=O (isocyanate), C=N—OH (hydroxylamine)
Z=P: C—PR$^6_2$ (phosphines),
   C—P=O (—O—)$_2$, (phosphonates, their acid and their esters)
   C—P=O (—O—)—C, (phosphinates, their acid and esters)
Z=O: C—O—H (carbinol), C—O—C (ether), C=O (ketone, aldehyde), C(O)—O— (carboxylic acid (ester)), C(O)C= (epoxide ring)
Z=S: C—S—H (mercaptan), C—S—C (sulfide), C—S$_x$—C (polysulfide with x=2, 3, 4, 5, 6, 7, and 8),
   —C(S)—S— (thiocarboxylic acid),
   C—S(=O)—C (sulfoxide), C—S(=O)$_2$ (sulfone),
   C—S=O(—O—) sulfinic acid (ester)),
   C—S=O(—O—)$_2$ sulfonic acid (ester)),
   —N=C=S (isothiocyanate), —C≡N=S (thiocyanate)
$R^6$ is hydrogen or a monovalent hydrocarbon radical having 1 to 12 C atoms.

Examples of monovalent N-containing radicals $R^5$ are n-aminoalkyl radicals, such as 3-aminopropyl radicals, it being possible for the aminopropyl radicals to be primary, secondary and tertiary amino radicals. One example of a primary amino radical is the 3-aminopropyl radical. Examples of secondary amino radicals are the cyclohexyl-, ethyl- or methyl-aminopropyl radical; examples of tertiary amino radicals are the dimethyl- and the diethyl-aminopropyl radical and the dipropyl- or dibutyl-amino-methyl radical. Examples of mixed primary, secondary, and tertiary amino radicals are the aminoethyl-3-aminopropyl radical, the diethyl-aminoethyl-aminopropyl radical. Examples of further N-containing radicals are alkylimino radicals, alkylcyano radicals such as the 3-cyanopropyl radical, alkylamido radicals, alkylimido radicals, alkylhydroxylamino radicals, and alkyloximo radicals; examples of divalent N-containing radicals $R^5$ are N,N'-bis(n-alkyl)alkylenediamine radicals, such as the N,N'-bispropylethylenediamine radical, and the 1-(piperazino)alkyl radical.

Examples of divalent P-containing radicals $R^5$ are phosphinatoalkylsilyl radicals, such as, for example, the free acid or the sodium salt of the 2-phosphinatobis[ethyldimethylsilyl] radical (e.g., ≡Si—CH$_2$—CH$_2$—P(=O) (O$^-$Na$^+$)—CH$_2$—CH$_2$—Si≡).

Examples of monovalent P-containing radicals $R^5$ are phosphonatoalkyl radicals, phosphinatoalkyl radicals, as acid and as its esters, such as dialkoxyphosphonatoalkyl radicals, such as the 3-(diethoxyphosphonato)propyl radical and the 1-(diethoxyphosphonato)methyl radical.

Examples of monovalent O-containing radicals $R^5$ are polyalkylene oxide radicals and polyalkylene oxidealkyl radicals, such as carbinol- and alkoxy-terminated polyalkylene oxide radicals, and polyalkylene oxidealkyl radicals, such as carbinol and alkoxy-terminated polyethylene oxide-alkyl radicals and polypropylene oxide-alkyl radicals, preferably having 3 to 20 chain members, are acryloyloxyalkyl radicals, alkylacryloyloxyalkyl radicals such as the 3-methacryloyloxypropyl radical and the 1-methacryloyloxymethyl radical, carbinol radicals, ether radicals such as alkyloxyalkyl radicals, glycidyloxyalkyl radicals such as the 3-glycidyloxypropyl radical, acid anhydridoalkyl radicals such as the succinic anhydridopropyl radical, alkyl ester alkyl radicals such as the 3-acetoxypropyl radical, isocyanate radicals, such as the 3-isocyanatopropyl radical and the 1-isocyanatomethyl radical, and the associated protected isocyanato radicals with, for example, isopropylamine or butoxime as a protective group.

Examples of monovalent S-containing radicals $R^5$ are mercaptoalkyl radicals such as the 3-mercaptopropyl radical, isothiocyanate radicals such as the 3-isothiocyanatopropyl radical, and bridged disulfido- and polysulfidoalkyl radicals.

Particularly preferred are the 3-aminoethylaminopropyl radical, the 3-aminopropyl radical, the 3-diethylaminopropyl radical, the 1-(piperazino)methyl radical, the 1-(diethoxyphosphinato)methyl radical, the 3-methacryloyloxypropyl radical, 1-methacryloyloxymethyl radical, the 3-isothiocyanatopropyl radical, the 3-mercaptopropyl radical, the 3-isocyanatopropyl radical, the isopropylamine-protected 1-isocyanatomethyl radical, and hydrogen.

Examples of reactive group-containing silylating agents are those which are selected preferably from aminoethylaminopropyltrimethoxysilane, aminoethylaminopropyltriethoxysilane, from aminopropyltrimethoxysilane, aminopropyltriethoxysilane, diethylaminopropylmethyldimethoxysilane, diethylaminopropylmethyldiethoxysilane, cyclohexylaminopropyltrimethoxysilane, cyclohexylaminopropyldimethoxysilane, N,N'-bis-trimethoxysilylpropyl-ethylenediamine, azacycles, such as N-[(3-aminopropyl)dimethylsilyl]-2,2-dimethyl-1-aza-2-silacyclopentane, 1-(piperazino)methyltrimethoxysilane, 1-(diethoxyphosphinato)methyltrimethoxysilane, 3-glycidyloxypropyltrimethoxysilane, 3-succinylpropyltrimethoxysilane, 3-mercaptopropyltrimethoxysilane, 3-methacryloyloxypropyltriethoxysilane, 1-methacryloyloxymethyldimethylmethoxysilane, 1-methacryloyloxymethyldimethylethoxysilane, 3-thioisocyanatopropyltrimethoxysilane, 3-thioisocyanatopropyltriethoxysilane, hydroxyl ethylene glycol-propyldimethyl-terminal polydimethylsiloxanes having a viscosity of greater than 500 mPas, the sodium salt of phosphinato-silicon compounds of the structure P(O$_2$Na)[C$_2$H$_4$Si(CH$_3$)$_2$OSi(CH$_3$)$_2$C$_2$H$_4$Si(OCH$_3$)$_3$]$_2$=phosphinatobis[ethyldimethylsiloxyethyl-trialkoxysilane] and P(O$_2$Na)[C$_2$H$_4$Si(CH$_3$)$_2$OSi(CH$_3$)$_2$C$_2$H$_4$]$_n$, and 1-(diethoxyphosphonato)methyltriethoxysilane.

Particular preference is given to N-[(3-aminopropyl)dimethylsilyl]-2,2-dimethyl-1-aza-2-silacyclopentane.

Organosiloxanes constructed from one or more alike or different units of the formula $$R^5_q R^1_r SiO_{(4-q-r)/2},$$

where
q=0, 1, 2 or 3
r=0, 1 or 2,
and q+r is <4.

The number of these units in one organosiloxane is at least 2.

Organosiloxanes are preferably liquid at loading temperature. In the case of those having a viscosity of greater than 1000 mPas, preference is given to the ones which can be dissolved in a technically manageable solvent (as defined above) with a concentration >10% and with a mixture viscosity of less than 1000 mPas at loading temperature.

Among organosiloxanes which are solid at loading temperature, preference is given to those which can be dissolved in a technically manageable solvent with a concentration of greater than 10% and with a mixture viscosity of less than 1000 mPas at loading temperature.

The silylating agents can be used alone or in any desired mixtures.

Preparation of the suspension.

For the preparation of the suspensions of the invention, the particles can be added to the liquid and are dispersed by wetting, or by shaking, such as with a tumble mixer, or with a high speed mixer, or by stirring. At low particle concentrations, simple stirring is generally sufficient for the incorporation of the particles into the liquid. Particularly preferred in the case of high particle concentrations is the incorporation into and dispersion of the particles in the liquid at a very high shear rate. Dispersion may take place in typical mixing equipment suitable for preparing emulsions and suspensions and producing a sufficiently high input of shear energy, such as, for example, high-speed stator/rotor stirrers, such as that in accordance with Prof. P. Willems, known under the registered trademark "Ultra-Turrax", or other stator/rotor systems, known under the registered trademarks such as Kady, Unimix, Koruma, Cavitron, Sonotron, Netzsch or Ystral. Other methods are ball mills, such as Dyno-Mill from WAB, CH, for example. Further methods are high-speed stirrers, such as paddle stirrers or cross-arm stirrers, dissolvers, having circumferential speeds of 1-50 m/s, for example, such as disk dissolvers from the company Getzmann, for example, or mixing systems such as planetary dissolvers, cross-arm dissolvers or other combined assemblies of dissolver systems and stirrer systems. Other suitable systems are extruders or compounders.

This operation may take place in discontinuous methods and in continuous methods.

Particularly suitable are systems which first of all, with effective stirring elements, achieve the wetting and incorporation of the silica into the liquid, in a closed container or vessel, for example, and in a second step disperse the silica at a very high shear rate. This can be done by a dispersing system in the first container, or by pumped circulation in an external pipeline containing a dispersing element, from the container, with preferably closed-loop recycling to the container. By means of partial recycling and partial continuous removal, this operation can preferably be made continuous.

Especially suitable for the dispersing of the silica in the suspension of the invention is the use of ultrasound in the range from 5 Hz to 500 kHz, preferably 10 kHz to 100 kHz, very preferably 15 kHz to 50 kHz; the ultrasonic dispersion may be continuous or discontinuous. It can be effected by means of individual ultrasonic transducers, such as ultrasound tips, or in continuous-flow systems, containing one or more ultrasonic transducers, such as ultrasound methods such as ultrasonic fingers and transducers, or ultrasonic continuous-flow cells, or ultrasound systems like those or similar to those supplied by Sonorex/Bandelin. Ultrasonic dispersion may be continuous or discontinuous.

The method of the invention for dispersing particles in a liquid may be carried out either discontinuously or continuously.

The suspension of the invention can of course also be produced in another way. It has been found, however, that the procedure is critical and that not all modes of preparation produce stable suspensions.

The processes of the invention have the advantage that they are very simple to carry out and that aqueous suspensions having very high solids contents can be produced.

The colloid-scale adhesive, such as reactive monomer, reactive oligomer or polymer, crosslinking systems, film-forming polymers, can be added before, during or after the addition and dispersion of the particles. This can be accomplished using low-shear systems but also using medium-shear and high-shear systems.

Particles with reactive surface groups can be added before, during or after the addition and dispersion of the particles. Dispersion takes place preferably as described above for the particles.

Use of the Suspensions of the Invention

The suspensions of the invention can be used in accordance with the invention for producing shaped porous articles and coats.

Examples of the use of shaped porous articles include their use as catalyst supports, as an adsorbent and absorbent for actives, as an adsorbent and absorbent for noxious substances, and as an adsorbent and absorbent for odorous substances and odors.

Examples of the use of porous coats include their use as a print medium for the receiving and fixing of ink, particularly ink-jet printing, in particular for digital printing, as a coating on surfaces in contact with marine water or inland water, characterized in that the surface in question has an inventively porous coating. Examples of coated surfaces are ships, hulls, boats, yachts, drilling platforms, moorings, nets for aquaculture, weirs, as a coating on ships, with nanoscale and micronscale rough and/or air-containing coatings, for preventing colonization by bacteria, algae, plants, fungi, and animals, such as barnacles, mussels, and others, with the advantage of a prolonged useful life of, for example, nets for fish farms and crustacean farms, in marine and fluvial and inland waters, and for reducing the frictional resistance of ships, with the advantage of a higher speed and/or low energy consumptions, such as lower fuel consumption, for example, and hence preservation of natural resources, and lower costs.

Surprisingly the coating of the invention produces an air/water interface.

In accordance with the invention the suspensions are used for coating surfaces in contact with marine water or inland waters, such as surfaces of ships and hulls, boats, yachts, marine constructions, such as weirs or moorings in the sea and in inland and coastal waters, nets for aquaculture of fish and crustaceans, in marine water and in inland waters, for the purpose for example of preventing algal infestation and infestation with sessile animals, such as barnacles, as a coating on the hulls of ships, boats, and yachts for the purpose of lowering the frictional resistance, as air-containing structures in paints and varnishes, or in fibers, for the purpose of lowering the specific weight and for thermal insulation.

EXAMPLES

Example 1

Dispersed in 556.7 g of isopropanol are 84.7 g of a highly hydrophobic fumed silica, modified with trimethylsiloxy groups and prepared by reacting a hydrophilic fumed silica having a BET specific surface area of 300 m$^2$/g and hexamethyldisilazane (available under the name HDK H30RM from Wacker-Chemie GmbH, Munich, Germany) and 5.0 g of a fumed silica modified with 3-aminopropyldimethylsiloxy groups (available under the name HDK H30RA from Wacker-Chemie GmbH, Munich, Germany), dispersions taking place with an Ultra Turrax toothed-disk dissolver for 5 minutes at 5000 revolutions per minute. Subsequently 3.6 g of an OH-terminal polydimethylsiloxane having a viscosity of 80 Pas at 25° C. and 0.04 g of tris(n-butylamino)methylsilane in 200 g of methyl ethyl ketone are incorporated by mixing, with a paddle stirrer, followed by 150 g of isopropanol. Thereafter the mixture is dispersed with a bead mill for 20 minutes.

The suspension is largely clear and has a grindometer value of 15 μm.

Example 2

Dispersed in 556.7 g of isopropanol are 84.7 g of a highly hydrophobic fumed silica, modified with trimethylsiloxy groups and prepared by reacting a hydrophilic fumed silica having a BET specific surface area of 300 m$^2$/g and hexamethyldisilazane (available under the name HDK H30RM from Wacker-Chemie GmbH, Munich, Germany) and 5.0 g of a fumed silica modified with 3 aminopropyldimethylsiloxy groups (available under the name HDK H30RA from Wacker-Chemie GmbH, Munich, Germany), dispersions taking place with an Ultra Turrax toothed-disk dissolver for 5 minutes at 5000 revolutions per minute. Subsequently 3.6 g of a thermoplastic silicone elastomer having a siloxane fraction of greater than 90% by weight and having a melt viscosity of 17,500 Pas at 150° C. (available from Wacker-Chemie GmbH, D, under the name Geniomer 140) in 200 g of methyl ethyl ketone are incorporated by mixing, with a paddle stirrer, followed by 150 g of isopropanol. Thereafter the mixture is dispersed with a bead mill for 20 minutes.

The suspension is largely clear and has a grindometer value of 15 μm.

Example 3

Dispersed in 556.7 g of isopropanol are 84.7 g of a highly hydrophobic fumed silica, modified with trimethylsiloxy groups and prepared by reacting a hydrophilic fumed silica having a BET specific surface area of 300 m$^2$/g and hexamethyldisilazane (available under the name HDK H30RM from Wacker-Chemie GmbH, Munich, Germany) and 5.0 g of a fumed silica modified with 3-aminopropyldimethylsiloxy groups (available under the name HDK H30RA from Wacker-Chemie GmbH, Munich, Germany), dispersions taking place with an Ultra Turrax toothed-disk dissolver for 5 minutes at 5000 revolutions per minute. Subsequently 3.6 g of an aminopropyl-functional silicone resin (available from Wacker-Chemie GmbH, D, under the name Silres HP2000) in 200 g of methyl ethyl ketone are incorporated by mixing, with a paddle stirrer, followed by 150 g of isopropanol. Thereafter the mixture is dispersed with a bead mill for 20 minutes.

The suspension is largely clear and has a grindometer value of 5 μm.

Example 4

Dispersed in 556.7 g of isopropanol are 84.7 g of a highly hydrophobic fumed silica, modified with trimethylsiloxy groups and prepared by reacting a hydrophilic fumed silica having a BET specific surface area of 300 m$^2$/g and hexamethyldisilazane (available under the name HDK H30RM from Wacker-Chemie GmbH, Munich, Germany) and 5.0 g of a fumed silica modified with 3-aminopropyldimethylsiloxy groups (available under the name HDK H30RA from Wacker-Chemie GmbH, Munich, Germany), dispersions taking place with an Ultra Turrax toothed-disk dissolver for 5 minutes at 5000 revolutions per minute. Subsequently 3.6 g of an aminopropyl-functional silicone oil having a viscosity of 4000 mPas at 25° C. (available from Wacker-Chemie GmbH, D, under the name BELSIL ADM 1100) in 200 g of methyl ethyl ketone are incorporated by mixing, with a paddle stirrer, followed by 150 g of isopropanol. Thereafter the mixture is dispersed with a bead mill for 20 minutes.

The suspension is largely clear and has a grindometer value of 5 μm.

Example 5

Dispersed in 550 g of isopropanol are 85 g of a highly hydrophobic fumed silica, modified with trimethylsiloxy groups and vinyldimethylsiloxy groups (vinyl:methyl=0.1) and prepared by reacting a hydrophilic fumed silica having a BET specific surface area of 300 m$^2$/g and hexamethyldisilazane and divinyltetramethyldisilazane, dispersions taking place with an Ultra Turrax toothed-disk dissolver for 5 minutes at 5000 revolutions per minute. Subsequently 40 g of an Si—H-functional siloxane having an average chain length of 100 Si atoms and a silicon-bonded hydrogen content of 0.5% by weight and 1.6 g of ethynylcyclohexanol in 200 g of methyl ethyl ketone are incorporated by mixing, with a paddle stirrer, followed by 150 g of isopropanol. Thereafter the mixture is dispersed with a bead mill for 20 minutes.

The suspension is largely clear and has a grindometer value of 5 μm.

After one day of storage, 1.6 g of a platinum-containing catalyst are mixed in (available from Wacker-Chemie GmbH, D, under the name Katalysator OL), and then the composition is applied to glass, using a coating knife.

Example 6

The suspensions from examples 1 to 5 are knife-coated onto a glass plate and then dried for 24 hours, at 25° C. and approximately 50% relative humidity. After 24 hours of storage an evaluation is made of the appearance, mechanical strength, thickness, hydrophobicity, and air content of the coating.

TABLE 1

| Suspension knife-coated onto glass | Appearance | Mechanical strength | Thickness | Hydrophobicity | Air content of coating |
|---|---|---|---|---|---|
| example 1 | matt | stable to finger rubbing | about 20 μm | water drops run off as beads | porous and silvery under water |
| example 2 | matt | stable to finger rubbing | about 20 μm | water drops run off as | porous and silvery |

TABLE 1-continued

| Suspension knife-coated onto glass | Appearance | Mechanical strength | Thickness | Hydrophobicity | Air content of coating |
|---|---|---|---|---|---|
| example 3 | matt | stable to finger rubbing | about 20 μm | water drops run off as beads | beads under water porous and silvery under water |
| example 4 | matt | stable to finger rubbing | about 20 μm | water drops run off as beads | porous and silvery under water |
| example 5 | matt | stable to finger rubbing | about 20 μm | water drops run off as beads | porous and silvery under water |

The invention claimed is:

1. A shaped porous article or coating comprising a dried suspension comprising:
   a) finely divided particles in amounts of 0.01%-50% by weight, the particles having a fractal mass dimension $D_m$ less than or equal to 2.8,
   b) at least one liquid, and
   c) at least one colloid-scale adhesive containing silicon atoms, in an amount of from 0.1 to 20 parts by weight based on 100 parts by weight of finely divided particles a) wherein the suspension, when dried to remove the liquid b), forms a porous solid which does not crumble or disintegrate under mechanical loading, wherein the liquid comprises an alkanol protic solvent, a non-protic polar solvent, or mixture thereof, and the finely divided particles comprise both hydrophobic fumed silica and a functionalized fumed silica containing aminoalkyl groups.

2. The shaped porous article of claim 1, wherein the colloid-scale adhesive comprises a reactive monomer.

3. The shaped porous article of claim 1, wherein the colloid-scale adhesive comprises a reactive oligomer or polymer.

4. The shaped porous article of claim 1, wherein the colloid-scale adhesive comprises a crosslinking system.

5. The shaped porous article of claim 1, wherein the colloid-scale adhesive comprises a film-forming polymer.

6. The shaped porous article of claim 1 which is a shaped catalyst support.

7. The shaped porous article of claim 1 which is an adsorbant.

8. A print medium, comprising a shaped porous article or coating of claim 1.

9. A surface in contact with marine or inland water, having a porous coating of claim 1 thereon.

10. The shaped porous article of claim 1, wherein the colloid scale adhesive is present at 2 to 10 parts by weight per 100 parts by weight of particles a).

11. A shaped porous article or coating comprising a dried suspension comprising:
   a) finely divided particles in amounts of 0.01%-50% by weight, the particles having a fractal mass dimension $D_m$ less than or equal to 2.8,
   b) at least one liquid, and
   c) at least one colloid-scale adhesive containing silicon atoms, in an amount of from 0.1 to 20 parts by weight based on 100 parts by weight of finely divided particles a) wherein the suspension, when dried to remove the liquid b), forms a porous solid which does not crumble or disintegrate under mechanical loading, wherein the liquid comprises an alkanol protic solvent, a non-protic polar solvent, or mixture thereof, the finely divided particulate solid comprises hydrophobic fumed silica, a fumed silica functionalized with aminoalkyl groups is also present, and the composition further comprises, as at least one component of the colloid-scale adhesive, an OH-functional organopolysiloxane, a thermoplastic silicone elastomer, an aminoalkyl-functional silicone resin, an aminoalkyl-functional silicone oil, or a mixture thereof.

12. The shaped porous article of claim 11, wherein the colloid-scale adhesive comprises a crosslinking system.

13. The shaped porous article of claim 11 which is a shaped catalyst support.

14. The shaped porous article of claim 11 which is an adsorbant.

15. A print medium, comprising a shaped porous article or coating of claim 11.

16. A surface in contact with marine or inland water, having a porous coating of claim 11 thereon.

17. The shaped porous article of claim 11, wherein the colloid scale adhesive is present at 2 to 10 parts by weight per 100 parts by weight of particles a).

18. A shaped porous article or coating comprising a dried suspension comprising:
   a) finely divided particles in amounts of 0.01%-50% by weight, the particles having a fractal mass dimension $D_m$ less than or equal to 2.8,
   b) at least one liquid, and
   c) at least one colloid-scale adhesive containing silicon atoms, in an amount of from 0.1 to 20 parts by weight based on 100 parts by weight of finely divided particles a) wherein the suspension, when dried to remove the liquid b), forms a porous solid which does not crumble or disintegrate under mechanical loading, wherein the finely divided particles a) comprises hydrophobic fumed silica, the liquid b) comprises an alkanol protic solvent, a non-protic polar solvent, or mixture thereof, and the colloid-scale adhesive comprises finely divided particles having reactive functional groups.

19. The shaped porous article of claim 18 which is a shaped catalyst support.

20. The shaped porous article of claim 18 which is an adsorbant.

21. A print medium, comprising a shaped porous article or coating of claim 18.

22. A surface in contact with marine or inland water, having a porous coating of claim 18 thereon.

23. The shaped porous article of claim 19, wherein the colloid scale adhesive is present at 2 to 10 parts by weight per 100 parts by weight of particles a).

* * * * *